HEATED WIPER BLADE

BACKGROUND

Heated window wipers have not been altogether practical for various reasons, among which are difficulties in manufacturing, nonuniformity of product, adversities imposed by the heating element which affect the physical properties of the product, and distortions which render the product unsuitable. These disadvantages are general, of course, it being an object of such wipers to employ the flow of electrical current to heat the wiping lip of the blade and thereby defrost ice formations from the surface being cleaned by means of the blade traversing said surface. The traversing motion of such blades is usually rapid and as a consequence utilitarian advantage of such heated blades is to prevent the accumulation and buildup of ice formations, rather than to melt away large ice formations previously formed. However, the heating of such wiper blades will disperse previous formations of ice and will cause secondary benefits in the form of freedom of the wiper blade and its supporting assembly from ice jams and, therefore, free to articulate and to conform to the compounded contours over which it is normally operated. For example, the internally heated wiper blade will melt itself free and to the end that the drive motor will not stall and be burned out.

Embedding of electrical conductors within the cross sectional confines of window wiper blades is met with various difficulties. Firstly, the coefficient of expansion of a metallic wire or coil, as is usually employed, is not expected to be the same as that of an elastomeric material such as rubber or the like. Further, the coefficient of expansion differential is aggravated by the substantial heat differences developed in the element and transferred to the wiper body (rubber) which is not the best conductor of heat; and all of which results in separation of the heating element from the body and internal abrasion, cutting and general mechanical breakdown within the heated wiper blade, with consequent loss of heat transfer due to separation of materials. Therefore, it is an object of this invention to provide a heating element configuration incorporated in an elastomeric body, especially a window wiper blade or the like, which is compatible with said body and which conforms to movements and/or deflections of said body, without undue restriction while acting secondarily as a reinforcement. With the present invention, the heating element is characterized by articulately related plate sections that are reinforced within the body area of the blade which is thereby strengthened and made of reduced cross section for a more direct heat transfer.

The usual filaments, elongated and/or coiled, heretofore employed in window wiper blades have been deficient for the purposes intended due to their adverse effect in distorting the end product and due to difficulties in manufacture, or both. Without detailing these adversities it is sufficient to refer to straight wires which lack flexibility, and to coils which are imbedded within such blades with difficulty or at substantial expense. Straight wire is no problem to embed within an extruded body, but a coiled wire is a difficulty which can be surmounted, for example, by means of extruding over a retractile mandrel that is withdrawn from the finished product after the wiper body has solidified over the coil initially supported by the mandrel. Therefore, it is an object of this invention to provide a universally flexible electrical heating element embedded within a body of elastomeric material, to replace the prior art wires, filaments and coils; an electrical heating element characterized by a foil or membrane comprised of plate sections joined by flexible coupling sections, whereby the wiper body and said heating element are independently flexible in all directions respectively.

The aforementioned structures involving coiled heating elements embedded in wiper bodies and the like cannot be extruded as finished products because of the mandrel in each instance. With the present invention it is an object to extrude a finished product in the form of a continuous wiper body cross section wherein the heating element is properly located without remaining cavities such as the useless cavities resulting from the prior art use of mandrels and which are conducive to defective operation as caused by moisture entering therein or by gasifying from within when heat is applied. Therefore, it is also an object to provide a method to so construct a window wiper body with a heating element embedded therein without voids and/or remaining chambers, and a heating element which remains independently flexible, the wiper element body also remaining independently flexible without distortion despite the incorporation therein of said heating element.

The proper location of heating elements within the cross section of window wiper blades has heretofore resulted in deformity of the finished product and/or has required the employment of a removable mandrel with added cost. However, with the present invention a cooperative relationship is established between the plate sections of the heating element and the method and/or apparatus means to guide the same; it being an object to provide coupling sections in the heating element which not only serve the purpose of flexibility but also cooperate as a traction and guide means enabling the continuous centralized embedment thereof within the extrusion. And, with the invention it is also an object to provide an apparatus in the form of an extrusion die which carries out cooperative method steps in an extruder that continuously forms the same.

The transfer of heat out of the prior art window wiper blades of the type under consideration has been questionable at least, due to the limited capacity of a heating element confined within an elastomeric material. That is, the temperature to which ordinary rubber and the like can be subjected is limited, and this limitation is further restricted by the insulating properties of said rubber and like materials. Therefore, it is an object of this invention to provide an electrical resistance element having maximum contact area (surface) engaged within the elastomeric wiper body; and to provide a wiper body of material adapted to withstand higher heat. With the present invention, the normal plane of the wiper blade and its lip is occupied at its median plane by a foil or membrane having a unique profile and plan configuration comprising the heating element, such as to reinforce the body of the wiper blade while permitting both the body and its lip to remain flexible as is required.

PATENTED MAR 6 1973 3,718,941

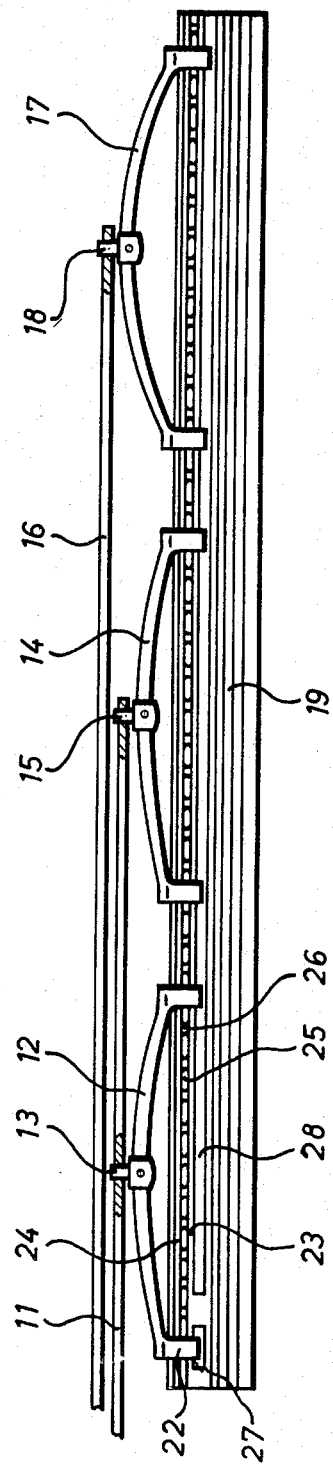

WINDSHIELD WIPER FOR CIRCULAR HEADLAMPS

BACKGROUND OF THE INVENTION

1. Field of the Invention

This invention relates in general to the construction of windshield wipers and, in particular, to a new and useful windshield wiper assembly for a circular headlamp.

2. Description of the Prior Art

For circular and highly curved headlamp glasses, it is not simple to provide a wiper installation in which substantially the whole light emitting surface is swept by the wiper blade, and in which the light emitting area is reduced only to an insignificant extent when the wiper is parked. The known windshield wiper constructions include a wiper assembly in which the wiper arm is mounted at a point outside the headlamp. The wiper is oscillated in order to move it over the headlamp glass, and the wiper element itself comprises a helical spring which carries a wiping ledge or brushes. During the wiping action over a highly curved glass, the wiper element does not always produce the required pressure application since the helical spring of the wiper element always tends to assume a position in which it encounters the least resistance. The wiper element may in fact lift off the glass which results in an inadequate wiping action.

SUMMARY OF THE INVENTION

In accordance with the present invention, there is provided a wiping installation particularly for use on circular and highly curved glasses for headlamps in which the whole glass area is wiped and which, when in the parking position, only a negligible portion of the headlamp glass is obscured. During the wiping operation, adequate pressure application is obtained over the entire length of the wiping blade at all times. According to the present invention, there is provided a wiper installation for curved glass, more particularly circular and highly curved headlamp glasses of an automobile vehicle, which comprises a plurality of wiper arms which are mounted about fixed oscillation axes for oscillation through distinct oscillation angles. The outer arm carries a stirrup which engages the wiper blade at two longitudinally spaced locations. At least one inner arm of shorter length carries two longitudinally spaced stirrups which engage the blade at longitudinally spaced inward locations from the outer arm stirrup. The wiper blade is advantageously made with a top portion having a spring which is bent into a wavy form from one end of the blade to the other, with the waves extending transversely to the blade length, so that the blade is resilient both in the wiping area plane and in the direction normal thereto. The assembly permits the wiper blade to be moved over the whole glass surface with adequate pressure application and the individual wiper arms variably control the various sections of the wiper blade. The outer stirrups engage the blade in a manner permitting the longitudinal movement of the blade relative to the stirrups, and only the inner stirrup is secured at one end in a fixed position. The construction permits parking with the blade supported against the frame of the headlamp glass so that the glass itself is substantially unobscured.

Accordingly, it is an object of the invention to provide an improved windshield wiper assembly which comprises a wiper blade which is resilient transversely and normal to the wiper field and which is carried by a long wiper arm having a stirrup pivotal about an axis normal to the wiper plane, and which engages the blade at two spaced longitudinal locations; and which further includes a shorter wiper arm, oscillatable about the same axes but through a wider angle of oscillation than the first arm, and which arm carries a plurality of longitudinally spaced stirrups which engage the wiper blade at spaced longitudinal locations.

A further object of the invention is to provide a wiper blade construction which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 4 is a side elevational view of a wiper blade assembly used in the installations of FIGS. 1 to 3.

GENERAL DESCRIPTION OF THE PREFERRED EMBODIMENT

Figure 1:
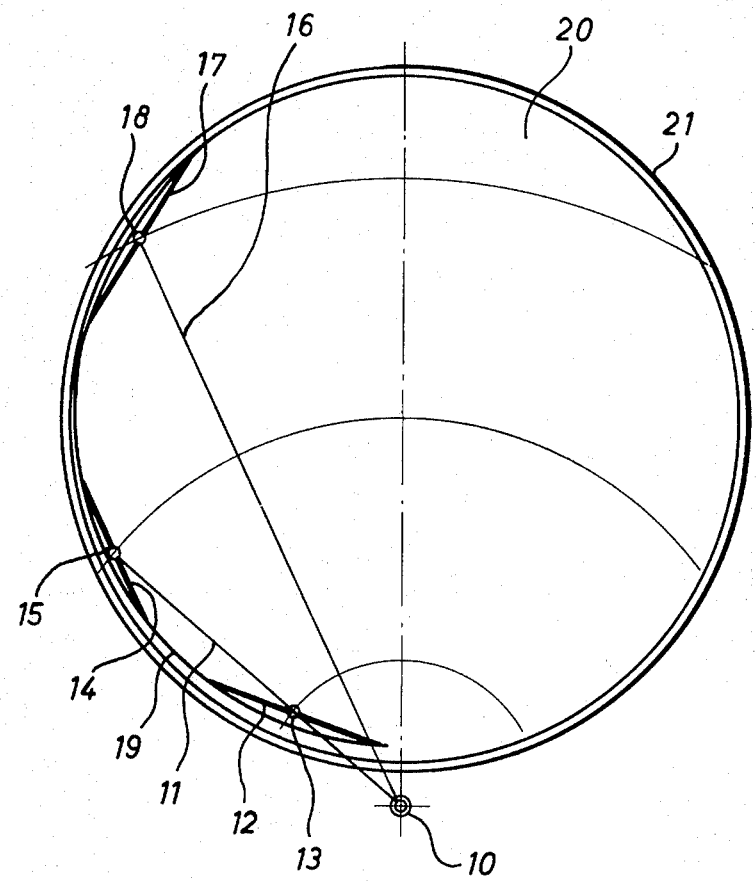
FIG. 1 is a schematic front elevation of a windshield wiper assembly for a circular headlamp.

Referring to the drawings in particular, the invention embodied therein, comprises a wiper assembly for a circular headlamp which comprises a double wiper arm oscillation pivot 10, with pivotal means connected to a drive for oscillating the pivot members through two separate oscillation angles, including a wide angle for a pivot arm 11, connected to the double pivot 10, and a smaller angle of oscillation for the pivot arm 16 connected to the double wiper pivot 10.

In accordance with a feature of the invention, the shorter wiper arm 11 carries two claw yokes, or stirrups, 12 and 14, which are arranged at spaced locations along the arm 11 and are rotatably mounted on pivot pines or axles 13 and 15, which are longitudinally spaced and arranged at right angles to the plane of the headlamp glass 20. The assembly also includes a longer arm 16, which carries a single yoke or stirrup 17 at its outer end which is pivoted on a pin 18 which also extends normal to the plane of the wiper glass 20.

All of the yokes 12, 14 and 17 are engaged over the outer edge of a common wiper blade 19, which is constructed to bend in the wiper area plane and at right angles to the plane, namely, transverse to the blade longitudinal axes. During oscillation, the individual yokes 12, 14 and 17 rotate about their respective axles 13, 15 and 18 on the respective arms 11 and 16. The wiper arm 11 sweeps over a larger wiping angle than the wiper arm 16. The wiper arm 16 is constructed to extend away from the glass by a further distance than the arm 11 so that the arm 11 can pass under it.

Figure 2:
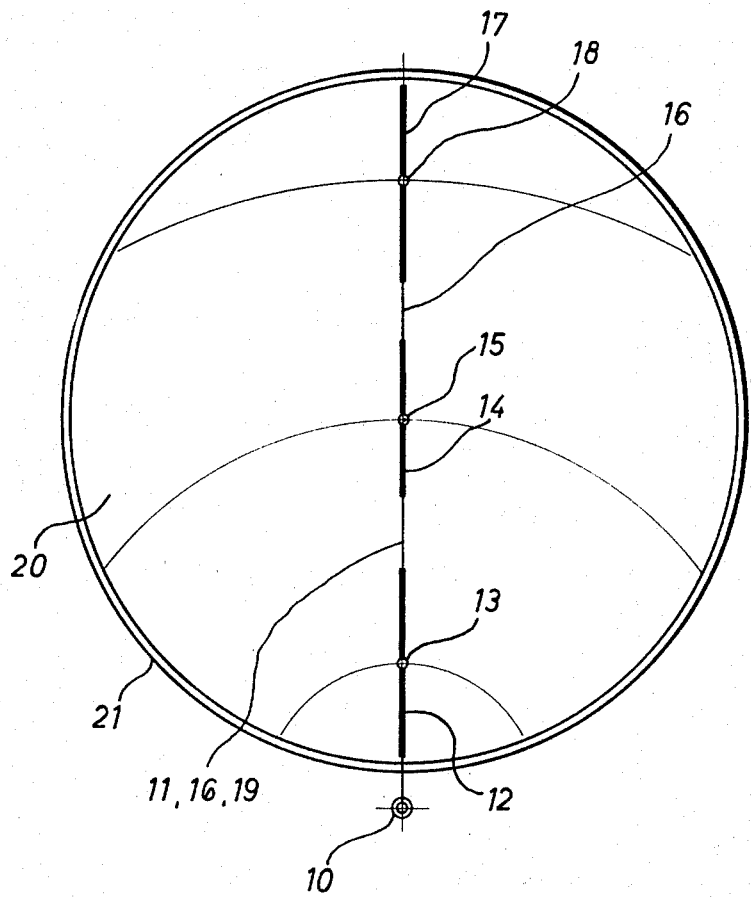
FIG. 2 is a view similar to FIG. 1 but with the wiper blade in a central position.

The oscillatory movements of the driving axles of the double wiper bearing 10 are so proportioned that, in a central position of the wiper blade shown in FIG. 2, the arms 11 and 16 and the yokes 12, 14 and 17 are all arranged along a straight line.

Figure 3:
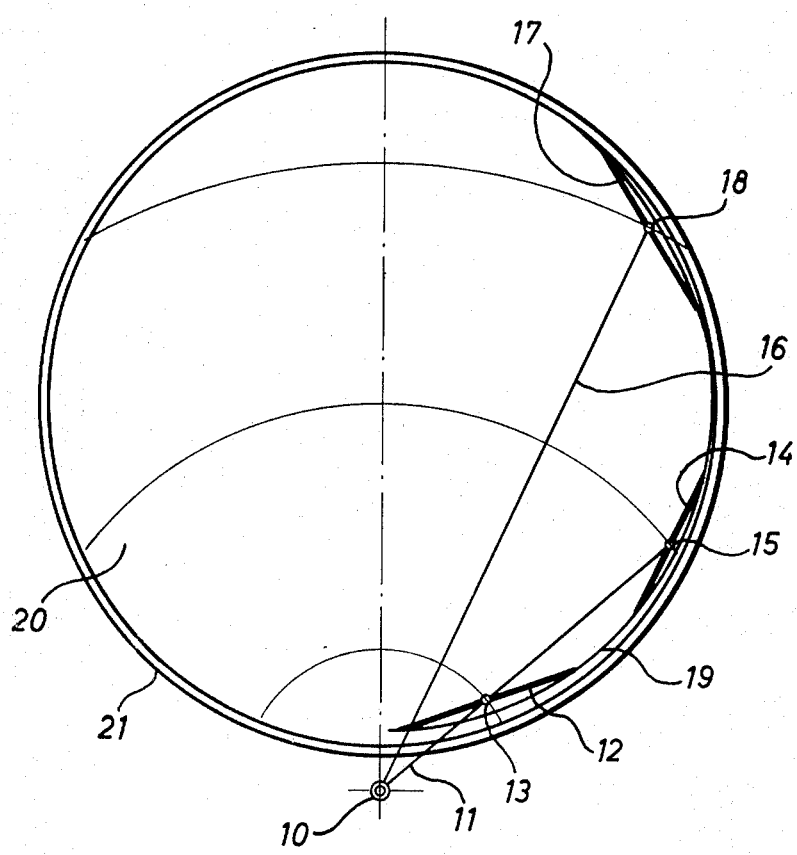
FIG. 3 is a view similar to FIG. 1 with the wiper blade in an opposite end position.

When the blade 19 is moved into the right hand end position shown in FIG. 3, the wiper arm 16 lags relative to the wiper arm 11. The wiper blade 19 rests against a cylindrical frame 21 of the headlamp glass. The yokes 12, 14 and 17 are turned into different inclined positions on the respective wiper arms 11 and 16 and these positions are caused by the curvature of the wiper blade 19 in the wiping area plane.

As shown in FIG. 4, the wiper blade is made of a resilient rubber material which is reinforced by a spring 26. The spring 26 is inserted in a longitudinal slot 25 which is of a width corresponding to the width of the blade. The slot 25 is formed between webs 23 and 24 of the blade 19 and the spring comprises a continuous length of wire in a wavy form with the waves extending ransverse to the longitudinal axis of the blade 19. The construction allows the blade 19 to bend and remain at right angles to the wiping area when in the wiper area plane. Bending in a different direction of the wiper blade is opposed by the spring resilience.

The individual yokes all engage the blade by yoke ends which are formed as claws which engaged into a longitudinally extending slot 28 of the blade. The yokes 14 and 17 are axially displaceable in the longitudinal slot 28 of the wiper blade 19. The yoke includes an inner claw 22 which is engaged in a short recess 27 so as to be non-displaceable, but the outer claw end of the stirrup 12 engages in the recess 28.

The pin connections 13, 15 and 18 of the stirrups 12, 14 and 17 of the respective wiper arms 11 and 16 permit the yokes to be turned in the wiping area plane on the respective wiper arms, so that the individual stirrups can assume the positions shown in the end positions of the blade illustrated in FIGS. 1 and 3.

While a specific embodiment of the invention has been shown and described in detail to illustrate the application of the principles of the invention, it will be understood that the invention may be embodied otherwise without departing from such principles.

What is claimed is:

1. A windshield wiper assembly for a highly curved glass, such as a cylindrical car headlamp, comprising a wiper blade of a length substantially equal to the maximum dimension of the glass to be wiped, at least one first long wiper arm having a mounting end and an opposite outer end, at least one second short arm shorter than said first arm and having a mounting end and an opposite outer end, double bearing means connected to said first and second arms and defining a common axis of oscillation for oscillating said arms through different oscillating angle ranges, a first stirrup engaged adjacent each end with said wiper blade and connected intermediate its ends to said first arm adjacent the outer end thereof and being rotatable at the connection about an axis substantially perpendicular to the plane of the area to be wiped, and a plurality of second stirrups with respective ends connected to said wiper blade at longitudinally spaced locations inwardly from said first stirrup and at longitudinally spaced locations in respect to each other and each connected intermediate its ends to said short arm adjacent the outer end thereof and being rotatable at the connection about an axis substantially perpendicular to the plane of the area to be wiped, said wiper blade being flexible and being bendable about the area of the glass to be wiped, said shorter arm being movable through a longer angular rang of oscillation than said longer arm.

2. A windshield wiper assembly, according to claim 1, wherein said longer wiper arm extends outwardly from the plane of the glass to be wiped and is located above said shorter wiper arm.

3. A windshield wiper assembly, according to claim 1, including bearing means carried on said long arm and said short arm for each of said first and second stirrups and rotatably mounting such stirrups on the associated arms.

4. A windshield wiper assembly, according to claim 1, wherein only one of said second stirrups is secured on the associated second arm against axial displacement.

5. A windshield wiper assembly, according to claim 1, wherein said wiper blade includes spring means thereon permitting transverse flexible movement of said blade, said spring means comprising a wave-shaped flat wire.

6. A windshield wiper assembly, according to claim 1, wherein said wiper blade includes a slot extending from one side to the other and longitudinally thereon, said blade having an undulated spring and carried in said groove with waves extending transversely to the longitudinal axis of said blade.

7. A windshield wiper assembly, according to claim 6, wherein said first and second stirrups have engagement claws at the respective ends thereof which engage into longitudinally extending recesses on each side of said blade.

8. A windshield wiper assembly, according to claim 7, wherein the inner one of said second stirrups has an inner engagement claw which is engaged with said wiper blade in the manner to hold it at a fixed location.

9. A windshield wiper assembly, according to claim 7, including a wave-shaped spring mounted to extend along the longitudinal length of said wiper blade with the waves extending transversely to the longitudinal axis thereof, said blade having a spring slot, each of said first and second stirrups including claws engaging around the top of said blade and into a longitudinally extending spring slot.

10. A windshield wiper assembly, according to claim 1, wherein said wiper blade is made of a resilient material and includes a claw-slot extending transversely therethrough intermediate its height which extends longitudinally in the area of said first and second stirrups, said first and second stirrups including engagement claws at each end having parts extending inwardly from each side of said blade into the associated claw-slot.

11. A windshield wiper assembly, according to claim 10, including a short claw slot separate from said longitudinally extending claw-slot of a size to accommodate only the inner end claw of the innermost one of said second stirrups, said second stirrups comprising two stirrups longitudinally spaced along said second short arm.

* * * * *